Jan. 1, 1935.    J. A. WINGER    1,986,313
MOTOR VEHICLE
Filed Aug. 31, 1933
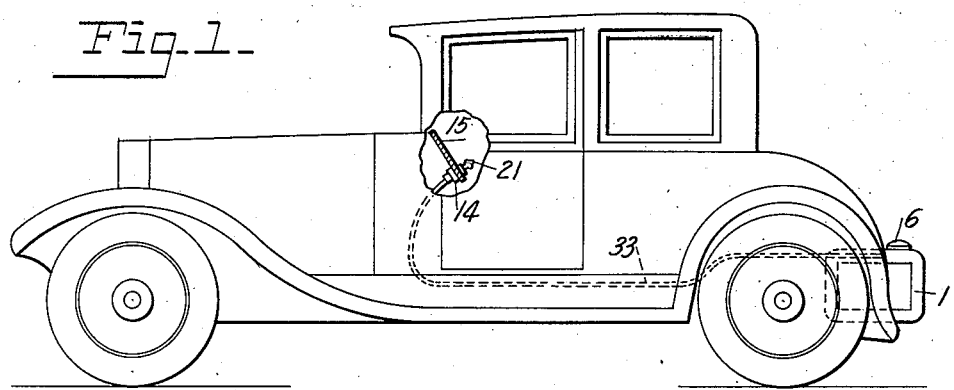
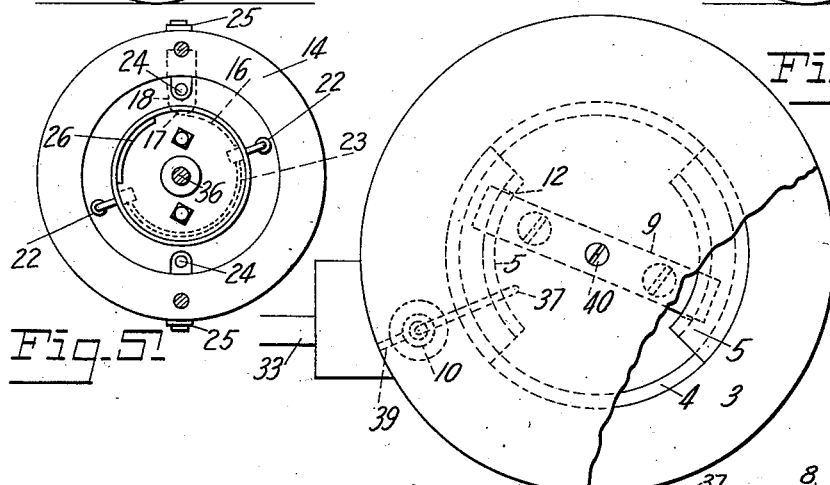
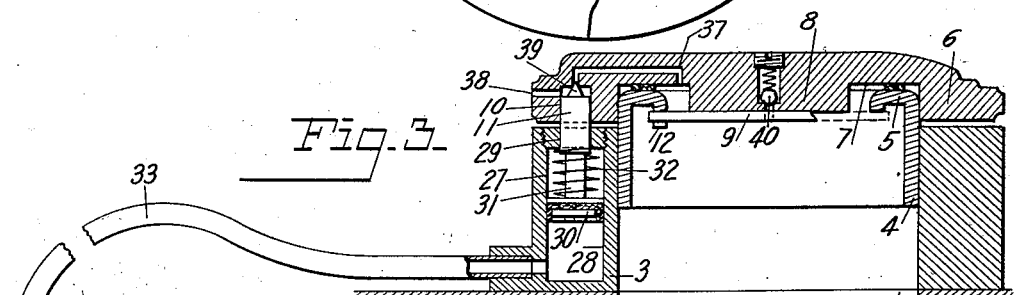
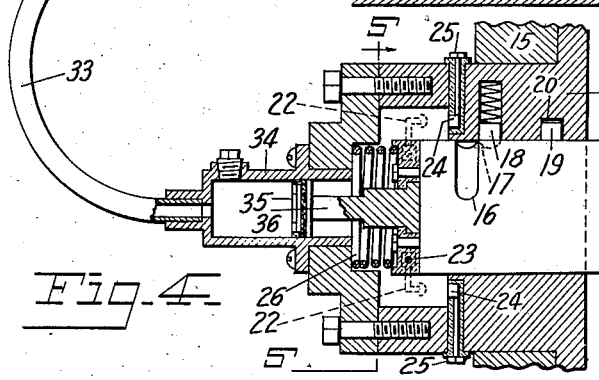
INVENTOR.
JOSEPH A. WINGER.
by
his ATTORNEY Patented Jan. 1, 1935

1,986,313

UNITED STATES PATENT OFFICE 1,986,313

MOTOR VEHICLE

Joseph A. Winger, Indianapolis, Ind.

Application August 31, 1933, Serial No. 687,633

17 Claims. (Cl. 123—146.5)

This invention relates to motor vehicles and more particularly to means for locking the cap or closure on the fuel tank and for controlling the withdrawal of fuel from the tank; and is in part a continuation of the application for patent filed by me February 24, 1931, Serial No. 517,717, now Patent No. 1,925,126 dated September 5, 1933.

One object of the invention is to provide means for locking the cap on the fuel tank when the ignition switch is opened.

A further object of the invention is to provide a lock for the cap on the fuel tank having means for so actuating the same that it will be in its locking position, when the switch actuating device is in its locking position but which will permit the switch to be opened without locking the cap, as when it is desired to interrupt the operation of the engine during the filling of the fuel tank.

A further object of the invention is to provide means to prevent the continued operation of the engine in the event the ignition switch is short circuited while in its open position.

Other objects of the invention will appear as the device is described in detail.

In the accompanying drawing Fig. 1 is a side elevation of a motor vehicle, partly broken away, and showing my invention applied thereto; Fig. 2 is a plan view, partly broken away, of the closure for the fuel tank; Fig. 3 is a vertical sectional view taken through the closure and the associated parts of the fuel tank; Fig. 4 is a sectional view taken through the ignition switch and its actuating device; and Fig. 5 is a section taken on the line 5—5 of Fig. 4, looking in the direction of the arrow.

In the drawing I have illustrated one embodiment of my invention and have shown the same in connection with an ignition switch of a well known type but it will be understood that the device may take various forms and may be utilized with ignition switches of various kinds.

In that embodiment of the invention here illustrated the motor vehicle is provided with the usual fuel tank 1, which is usually mounted at the rear end of the vehicle. This tank has a filling opening 2 surrounded by an upright flange or boss 3, and mounted within this boss and rigidly secured thereto is a collar 4, the upper portion of which projects above the boss and is provided with inwardly turned segmental portions 5 forming flanges. A closure 6 rests upon the upper end of the boss 3 and has in its inner surface a recess 7 to receive the upper portion of the collar 4, about which the closure fits snugly. The closure is also provided with a depending intermediate portion 8 to which is secured a cross bar 9 so arranged that when the cap is placed on the boss 3 the end portions of the bar will enter between the flanges 5 and when rotatory movement is imparted to the cap these end portions of the bar will engage beneath the flanges 5 to secure the cap in a position to close the opening. For the purpose of locking the cap or closure in its closed position I have provided the same with a locking recess 10 adapted to receive the end of a locking member or plunger 11 carried by the tank, the recess and locking member being so arranged that the locking member can enter the recess only when the closure is in its proper position on the boss. Preferably one of the flanges 5 is provided with a depending lug or stop 12 to interrupt the rotatory movement of the closure when the recess 10 is in its proper position with relation to the locking member.

The position of the locking member 11 is controlled by the actuating device for the ignition switch, which is shown in Fig. 4. The ignition switch may take various forms but it is here shown as comprising an actuating device or plunger 13 mounted in a casing 14 carried by the instrument board 15 of the vehicle. The actuating plunger is mounted for both rotatory and reciprocatory movement in the casing and it has in its exterior surface a groove comprising a circumferential portion 16 and a longitudinal portion 17. A spring pressed guide pin or detent 18 is mounted in the casing 14 and projects into the groove to control the movement of the plunger, the arrangement being such that when the actuating plunger is in its outermost or circuit closing position the detent 18 will lie in the circumferential portion 16 of the groove, and in order to open the switch and lock the same in its open position the actuating member must be first rotated to bring the longitudinal portion 17 into line with the detent and then pressed inwardly. The means for locking the switch in its open position is here shown as comprising a radial bolt 19 adapted to enter a locking recess 20 in the casing 14, the bolt being controlled by a key 21 which serves both to actuate the bolt and to rotate the actuating plunger. The locking mechanism for the actuating device forms no part of the present invention, except as it enters into combination with the other parts, and inasmuch as it is of a well known type it need not be illustrated or described in detail. Mounted on the inner end of the actuating plunger 13, within the casing, are two contact members 22 which are movable with the plunger and are connected one to the other by a conductor 23. These contact members are movable respectively into engagement with stationary contact members 24 mounted in the casing 14 and connected with the respective sides of the ignition circuit 25. A spring 26 acts on the actuating plunger 13 to move the same outwardly and tends to hold the contacts 22 in firm engagement with the stationary contacts 24. When the actuating plunger is in its innermost position, as shown in Fig. 4, the contacts 22 and 24 will be out of engagement one with the other and the ignition circuit opened. At this time the detent 18 is in engagement with the longitudinal portion 17 of the groove in the plunger and the bolt 19 is set to lock the plunger in this position. When the circuit is to be closed the key is actuated to retract the bolt 19 and the spring 26 then moves the actuating plunger outwardly, bringing the contacts 22 into engagement with the inner surface of the casing 14 and also bringing the detent 18 into the circumferential portion 16 of the groove. The plunger is then rotated, by the key 21, to move the contacts 22 into engagement with the contacts 24 and thus close the circuit. To open the circuit it is only necessary to rotate the plunger and thus move the contacts 22 out of engagement with the contacts 24, but if the switch is to be locked in its open position the plunger must be moved inwardly to the position shown in Fig. 4 and the key actuated to set the bolt 19.

The movement of the actuating device or plunger 13 is utilized to actuate the closure locking device 11. Any suitable connection may be interposed between the locking member 11 and the actuating plunger 13 which will cause the locking member to move with the plunger when reciprocatory movement is imparted by the latter and which will not interfere with the rotatory movement of the plunger. In the present construction I have employed a fluid operated mechanism for connecting the plunger with the locking member, the locking member being provided with a fluid operated actuating device and the switch actuating plunger being provided with a pressure creating device which is connected with the fluid operated device. As here shown, the locking member 11 for the closure is mounted for vertical movement in the boss 3 and the locking recess in the closure is in the lower surface of the closure above the boss. The boss is provided with a recess 27, the lower portion of which constitutes a cylinder 28 and the upper portion of which is of reduced diameter, as shown at 29, to receive and guide the locking member 11. A piston 30 is mounted in the cylinder 28 and connected with the locking member 11 by a piston rod 31, which in the present instance is integral with the locking member. If desired, a spring 32 may be mounted about the piston rod and confined between the upper end of the cylinder and the piston to assist in retracting the same when the pressure in the cylinder is relieved. The lower end of this cylinder is connected by a conduit 33, preferably of flexible metal, with a cylinder 34 which is mounted on the inner end of the casing 14 in alinement with the switch actuating plunger 13. Mounted in the cylinder 34 is a piston 35 which is connected with the actuating plunger by a piston rod 36. It will be apparent that when the actuating plunger is moved inwardly to its locking position the piston 35 will create a fluid pressure in the cylinder 34 and this pressure will be transmitted to the cylinder 28 and will act on the piston 30 to project the locking member 11, and if the closure is in proper position the locking member will enter the locking recess 10 therein and lock the closure against removal. If the closure is not in proper position the locking member cannot enter the recess and the switch actuating plunger cannot be moved to its innermost position until the closure has been properly adjusted. When the switch actuating plunger is unlocked and moved outwardly by the spring 26 the suction created in the cylinder 34 by the retraction of the piston 35 will tend to draw the piston 30 and the locking member downwardly, this movement being assisted by the spring 32.

It will be apparent, therefore, that whenever the switch actuating plunger is in its locked position the locking member 11 will be in its locking position. However, the ignition circuit is opened by the mere rotation of the actuating plunger and this does not operate the locking member 11. Consequently the engine can be stopped without locking the closure on the tank, as when the fuel tank is to be filled. As is usual in an ignition switch of this type, the key 21 cannot be removed from the lock until the actuating plunger has been pressed inwardly and locked in its innermost position. Consequently the key cannot be removed without locking the closure on the tank.

Automobiles are sometimes stolen or operated by unauthorized persons by short circuiting the ignition switch on the instrument board and I have in the present apparatus provided means for preventing the engine being operated for any considerable period of time when the ignition switch is so short circuited. To accomplish this I have provided means for closing the vent in the fuel tank when the ignition switch is locked in its open position. With the vent closed only a limited amount of fuel can be withdrawn from the fuel tank and as a result the operation of the engine will be interrupted after a relatively brief period of operation. In the present construction I have, for the purpose of simplicity, utilized the locking member for the tank closure to control the vent and have placed the vent in the closure in communication with the locking recess 10. As here shown, the vent comprises a part 37 leading from the tank to the locking recess 10 and a second part 38 leading from the locking recess to the atmosphere. The end of the part 37 of the vent is at the upper end of the recess 10 and constitutes a valve seat which is adapted to be engaged by the end of the locking member 11 when the latter is in its locking position, the locking member being here shown as having a tapered end 39 to engage the valve seat. It will be apparent, therefore, that whenever the ignition switch is locked in its open position the vent for the tank will be closed. While it will be obvious that separate members could be used for locking the closure on the tank and for controlling the vent for the tank I prefer to use a single member for accomplishing these two functions as it not only simplifies the construction but it permits both functions to be accomplished simultaneously and by a single operating device.

If desired, the closure may also be provided with a relief valve, as shown at 40, to relieve excess pressure in the tank which might result from the expansion or vaporization of the fuel while the vent is closed.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a motor vehicle comprising a fuel tank having a filling opening, a movable closure for said filling opening, a device for locking said closure in its closed position, an ignition circuit including a switch, and a switch actuating device having means for locking the switch in its open position; means operable by said switch actuating device to cause the locking device for said tank closure to be retained in its locking position when said switch actuating device is locked in a position to open the ignition circuit.

2. In a motor vehicle comprising a fuel tank having a filling opening, a movable closure for said filling opening, a device for locking said closure in its closed position, an ignition circuit including a switch, and a switch actuating device having means for locking the switch in its open position; means operated by said switch actuating device to move the locking device for said closure to its locking position when said switch actuating device is moved to its locking position.

3. In a motor vehicle comprising a fuel tank having a filling opening, a movable closure for said filling opening, an ignition circuit including a switch, and a switch actuating device having means for locking said switch in its open position; a fluid pressure operated device for locking said tank closure in its closed position, and means operated by said switch actuating device to cause fluid pressure to be exerted on said locking device when said switch actuating device is moved to its locking position.

4. In a motor vehicle comprising a fuel tank having a filling opening, a movable closure for said filling opening, a device for locking said closure in its closed position, an ignition circuit including a switch, and a switch actuating device having means for locking the switch in its open position, said switch actuating device having one movement to open said circuit and another movement to its locking position; means operated by the last mentioned movement of said switch actuating device to cause said closure locking device to move to its locking position.

5. In a motor vehicle having an ignition circuit including a switch, an actuating device for said switch having means for locking the switch in its open position, a fuel tank having a filling opening surrounded by a boss, and a closure for said opening having means for securing it to said boss; said boss having a recess opening through the outer edge thereof and said closure having a recess to register with the recess in said boss when said closure is in its closed position, a locking member mounted in the recess in said boss for movement into the recess in said closure, and means operated by said switch actuating device to cause said locking member to be actuated when said switch actuating device is moved to its locking position.

6. In a motor vehicle having an ignition circuit including a switch, an actuating device for said switch having means for locking the switch in its open position, a fuel tank having a filling opening surrounded by a boss, and a closure for said opening having means for securing it to said boss; said boss having a recess opening through the outer edge thereof and said closure having a recess to register with the recess in said boss when said closure is in its closed position, a locking member mounted in the recess in said boss for movement into the recess in said closure, a fluid pressure operated device mounted in the recess in said boss and operatively connected with said locking member, a device for creating fluid pressure operatively connected with said switch actuating device, and a conduit connecting said pressure creating device with said pressure operated device.

7. In a motor vehicle having an ignition circuit including a switch, an actuating device for said switch having means for locking the switch in its open position, a fuel tank having a filling opening surrounded by a boss, and a closure for said opening having means for securing it to said boss; said boss having a recess opening through the outer edge thereof and said closure having a recess to register with the recess in said boss when said closure is in its closed position, a locking member mounted in the recess in said boss for movement into the recess in said closure, the recess in said boss having a part forming a cylinder, a piston mounted in said cylinder and operatively connected with said locking member, a second cylinder mounted adjacent to said switch actuating device, a piston mounted in said second cylinder and operatively connected with said switch actuating device, and a conduit connecting said cylinders.

8. In a motor vehicle comprising a fuel tank having a filling opening, a movable closure for said filling opening, a device for locking said closure in its closed position, an ignition circuit including a switch, and a switch actuating device having means for locking the switch in its open position; a fluid pressure operated device operatively connected with the locking device for said closure, a fluid pressure creating device connected with said switch actuating device for operation thereby, and a conduit connecting said pressure creating device with said pressure operated device.

9. In a motor vehicle comprising a fuel tank having a filling opening, a movable closure for said filling opening, a device for locking said closure in its closed position, an ignition circuit including a switch, and a switch actuating device having means for locking the switch in its open position, said tank having a vent to admit air thereto; means operated by said switch actuating device to cause said vent to be closed and to cause said locking device for said closure to be retained in its locking position when said switch actuating device is moved to its locking position.

10. In a motor vehicle comprising a fuel tank having a filling opening, a movable closure for said filling opening, an ignition circuit including a switch, and a switch actuating device having means for locking said switch in its open position, said closure having a vent to admit air to said tank; a locking member movable into and out of locking engagement with said closure and having means to close said vent when said member is in its locking position, and means operated by said switch actuating device to cause said locking member to be moved to its locking position when said switch actuating device is moved to its locking position.

11. In a motor vehicle comprising a fuel tank having a filling opening, a movable closure for said filling opening, a device for locking said closure in its closed position, an ignition circuit including a switch, and a switch actuating device having means for locking the switch in its open position, said tank having a vent to admit air thereto; a movable member to open and close said vent, and means operated by said switch actuating device when the latter is moved to its locking position to cause said movable member to be moved to a position to close said vent.

12. In a motor vehicle comprising a fuel tank having a filling opening, a movable closure for said opening, and a vent to admit air to said tank; means carried by said tank to lock said closure in its closed position and to close said vent, and a device mounted at a point remote from said tank and having means for actuating the first mentioned means and for locking the same in a position to retain said closure in its closed position and to maintain said vent closed.

13. In a motor vehicle comprising a fuel tank having a filling opening; a closure for said filling opening having a locking recess, and a vent communicating with said recess and adapted to admit air to said tank, a locking member mounted on said tank for movement into and out of said locking recess and having means for closing said vent when it is in said recess, and a device mounted at a point remote from said closure to cause said locking member to enter said locking recess and close said vent and to lock the same therein.

14. In a motor vehicle comprising a fuel tank having a vent; means carried by said tank to open and close said vent, and a device mounted at a point remote from said tank to cause said means to close said vent and to lock the same in vent closing position.

15. In a motor vehicle comprising a fuel tank having a filling opening, a movable closure for said filling opening, a device for locking said closure in its closed position, an ignition circuit including a switch, and a switch actuating device; means controlled by said switch actuating device to cause the locking device for said tank closure to be retained in its locking position when said switch actuating device is in a position to open the ignition circuit.

16. In a motor vehicle comprising a fuel tank having a filling opening, a movable closure for said filling opening, a device for locking said closure in its closed position, an ignition circuit including a switch, and a switch actuating device; means operated by said switch actuating device to move the locking device for said closure to its locking position when said switch actuating device is moved to a position to open the ignition circuit.

17. In a motor vehicle comprising a fuel tank having a filling opening, a movable closure for said filling opening, a device for locking said closure in its closed position, an ignition circuit including a switch, and a switch actuating device; a fluid pressure operated device for locking said tank closure in its closed position, and means actuated by said switch actuating device to cause fluid pressure to be exerted on said locking device when said switch actuating device is moved to a position to open said circuit.

JOSEPH A. WINGER.